UNITED STATES PATENT OFFICE.

HUGH RODMAN, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

ELECTROLYTIC REDUCTION OF METALLIC COMPOUNDS.

No. 884,763.   Specification of Letters Patent.   Patented April 14, 1908.

Application filed May 17, 1902. Serial No. 107,793.

*To all whom it may concern:*

Be it known that I, HUGH RODMAN, a citizen of the United States, residing at Philadelphia, in the county of Philadelphia and State of Pennsylvania, have invented certain new and useful Improvements in the Electrolytic Reduction of Metallic Compounds, of which the following is a specification.

The object of the present invention is to provide for producing metal capable of use, among other things, as active material for storage batteries.

To this and other ends hereinafter set forth, the invention, stated in general terms, comprises the electrolytic reduction of the compounds of the metals in an alkaline solution containing a soluble sulfid.

Certain metallic compounds, such as oxid of iron, $Fe_2O_3$, are inert in ordinary alkaline electrolytes upon the passage of current, and I will choose this oxid of iron in describing my invention although the latter is not confined to it. This oxid of iron is not inert but can be readily reduced to the metallic state by electrolysis, if the alkaline solution contains a soluble sulfid, such as potassium sulfid, $K_2S$. The electrolyte may consist of a solution of caustic potash to which has been added potassium sulfid, or it may consist of potassium sulfid only, but the former is believed to be in many instances preferable. The proportions or the strength of the solution are not important and may be very widely varied, but I may mention as an example a ten per cent. solution of caustic potash to which has been added five per cent. of dry potassium sulfid. In reducing a mass of iron oxid of about an inch square and one-eighth of an inch thick, in the described electrolyte, there would be required about one-eighth of an ampere for about twelve hours; the oxid constituting the cathode, and the anode being of any suitable material, as lead or carbon.

It will be obvious to those skilled in the art to which the invention relates that modifications may be made in details without departing from the spirit thereof, hence I do not limit myself to the precise mode of procedure herein set forth, but

Having thus described the nature and objects of the invention, what I claim as new and desire to secure by Letters Patent is—

1. The process of reducing iron oxid which consists in subjecting the same to electrolysis as a cathode in an electrolyte containing a soluble sulfid, substantially as described.

2. The process of reducing iron oxid which consists in subjecting the same to electrolysis as a cathode in an electrolyte containing an alkali and a soluble sulfid, substantially as described.

In testimony whereof I have hereunto signed my name.

HUGH RODMAN.

Witnesses:
BRUCE FORD,
GEO. M. HOWARr